(12) United States Patent
Iwama et al.

(10) Patent No.: US 12,709,280 B2
(45) **Date of Patent: *Aug. 18, 2026**

(54) DRIVING ABILITY DETERMINATION SYSTEM AND DRIVING ABILITY DETERMINATION METHOD

(71) Applicant: Honda Motor Co., Ltd., Tokyo (JP)

(72) Inventors: Taiki Iwama, Tokyo (JP); Toshifumi Matsuno, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 18/852,797

(22) PCT Filed: Mar. 31, 2022

(86) PCT No.: PCT/JP2022/016529

§ 371 (c)(1),
(2) Date: Sep. 30, 2024

(87) PCT Pub. No.: WO2023/188276

PCT Pub. Date: Oct. 5, 2023

(65) Prior Publication Data

US 2025/0178611 A1 Jun. 5, 2025

(51) Int. Cl.
*B60W 40/09* (2012.01)
*B60W 40/08* (2012.01)

(52) U.S. Cl.
CPC ............ *B60W 40/09* (2013.01); *B60W 40/08* (2013.01); *B60W 2040/0818* (2013.01); (Continued)

(58) Field of Classification Search
CPC ............. B60W 40/09; B60W 2540/18; B60W 2540/22; B60W 2556/10; B60W 2040/0818; B60W 40/08
See application file for complete search history.

(56) References Cited

U.S. PATENT DOCUMENTS

| | | | | |
|---|---|---|---|---|
| 9,776,644 | B2 * | 10/2017 | Chun | A61B 5/7267 |
| 2019/0126932 | A1 * | 5/2019 | Nishimura | B60W 40/04 |
| 2025/0174056 | A1 * | 5/2025 | Iwama | G08G 1/00 |

FOREIGN PATENT DOCUMENTS

| | | | |
|---|---|---|---|
| JP | 2014174848 | A | 9/2014 |
| WO | 2012157192 | A1 | 11/2012 |
| WO | 2013190753 | A1 | 12/2013 |

OTHER PUBLICATIONS

International Search Report; Application PCT/JP2022/016529; Jun. 21, 2022.

* cited by examiner

*Primary Examiner* — John A Tweel, Jr.
(74) *Attorney, Agent, or Firm* — Duft & Bornsen, PC

(57) ABSTRACT

A driving ability determination system includes a processor and memory coupled to the processor. The processor is configured to perform: acquiring time-series travel data of a vehicle; calculating an evaluation value indicating a steering characteristic of a driver of the vehicle based on the travel data; and determining whether a predetermined event in which a predetermined load acts on the driver has occurred based on the travel data. The calculating includes specifying, as specific travel data, the travel data acquired after a time point at which it is determined that the predetermined event has occurred, calculating a first evaluation value based on the travel data by excluding the specific travel data from first travel data or based on the travel data corrected, and calculating a second evaluation value when the predetermined load acts on the driver based on the first evaluation value and second travel data.

5 Claims, 5 Drawing Sheets

(52) U.S. Cl.
CPC ..... *B60W 2540/18* (2013.01); *B60W 2540/22* (2013.01); *B60W 2556/10* (2020.02)

*FIG. 1*

<table>
<tr><th>SECTION</th><th>DRIVING LOAD</th><th>α VALUE</th><th>Hp VALUE</th></tr>
<tr><td>STRAIGHT TRACK</td><td>NO-LOAD</td><td rowspan="6">USED</td><td rowspan="4"></td></tr>
<tr><td>RIGHT CURVE</td><td rowspan="5">LOW-LOAD</td></tr>
<tr><td>LEFT CURVE</td></tr>
<tr><td>LANE CHANGE</td></tr>
<tr><td>RIGHT TURNING</td><td>USED</td></tr>
<tr><td>LEFT TURNING</td><td rowspan="4"></td></tr>
<tr><td>S-SHAPED CURVE</td><td rowspan="3">HIGH-LOAD</td><td rowspan="3"></td></tr>
<tr><td>CRANK PATH</td></tr>
<tr><td>PARKING</td></tr>
</table>

DRIVING ABILITY DETERMINATION SYSTEM AND DRIVING ABILITY DETERMINATION METHOD

CROSS-REFERENCE TO RELATED APPLICATION

This application is a National Stage of PCT international application Ser. No. PCT/JP2022/016529 filed on Mar. 31, 2022, which designates the United States, incorporated herein by reference.

TECHNICAL FIELD

The present invention relates to a driving ability determination system and a driving ability determination method that determines a driving ability of a driver of a vehicle.

BACKGROUND ART

As this type of device, there has been conventionally known a device that measures a safe driving ability of a driver (see, for example, Patent Literature 1). In the device described in Patent Literature 1, a load is applied to a driver to disperse attention by intermittently outputting sound, steering entropy values indicating shaking of steering in a load state and a no-load state are calculated, and a safe driving ability of the driver is evaluated based on a difference between shaking evaluation values calculated in the load state and the no-load state.

CITATION LIST

Patent Literature

Patent Literature 1: Japanese Unexamined Patent Publication No. 2014-174848

SUMMARY OF INVENTION

Technical Problem

However, in the device described in Patent Literature 1, it is necessary to apply a load to a driver in order to evaluate a safe driving ability of the driver, which hinders driving.

Solution to Problem

An aspect of the present invention is a driving ability determination system, including: an information acquisition unit configured to acquire time-series travel data of a vehicle: an evaluation value calculation unit configured to calculate an evaluation value indicating a steering characteristic of a driver of the vehicle based on the travel data acquired by the information acquisition unit; and an event occurrence determination unit configured to determine whether a predetermined event in which a predetermined load acts on the driver has occurred based on the travel data acquired by the information acquisition unit. The evaluation value calculation unit specifies, as specific travel data, the travel data acquired by the information acquisition unit after a time point at which it is determined by the event occurrence determination unit that the predetermined event has occurred from among the travel data acquired by the information acquisition unit, and calculates the evaluation value based on travel data obtained by excluding the specific travel data from the travel data acquired by the information acquisition unit or based on travel data corrected so that a weight for the evaluation value of the specific travel data is lower than a weight for the evaluation value of rest of the travel data.

Another aspect of the present invention is a driving ability determination method, including the steps of: an information acquisition step for acquiring time-series travel data of a vehicle: an evaluation value calculation step for calculating an evaluation value indicating a steering characteristic of a driver of the vehicle based on the travel data acquired in the information acquisition step; and an event occurrence determination step for determining whether a predetermined event in which a predetermined load acts on the driver has occurred based on the travel data acquired in the information acquisition step. The evaluation value calculation step includes specifying, as specific travel data, the travel data acquired in the information acquisition step after a time point at which it is determined in the event occurrence determination step that the predetermined event has occurred from among the travel data acquired in the information acquisition step, and calculating the evaluation value based on travel data obtained by excluding the specific travel data from the travel data acquired in the information acquisition step or based on travel data corrected so that a weight for the evaluation value of the specific travel data is lower than a weight for the evaluation value of rest of the travel data.

Advantageous Effects of the Invention

According to the present invention, it becomes possible to determine the driving ability without hindering driving.

BRIEF DESCRIPTION OF DRAWINGS

FIG. 1 A diagram for explaining a travel section and a driving load

DESCRIPTION OF EMBODIMENT

Figure 2:
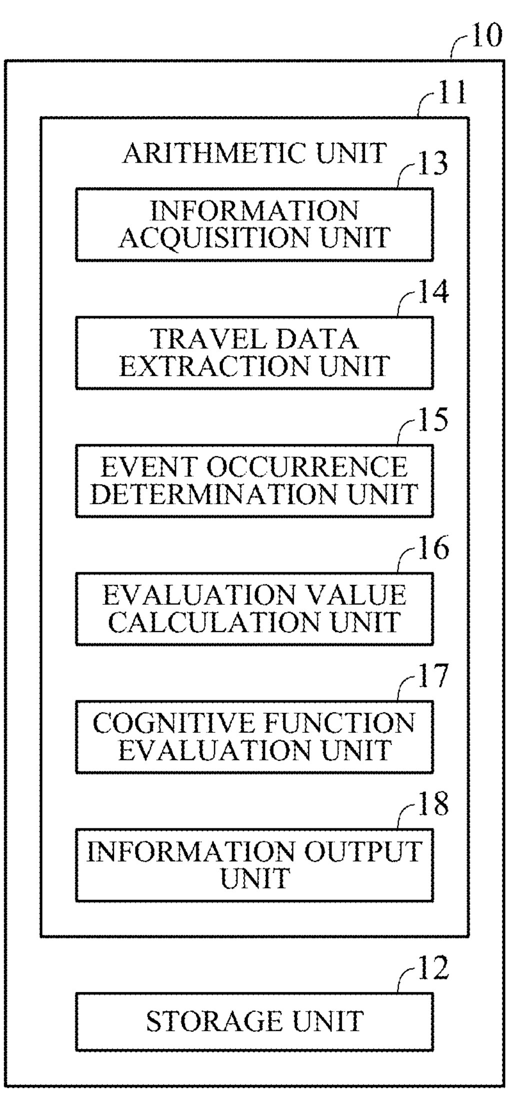
FIG. 2 A block diagram illustrating an example of a main configuration of a driving ability determination system according to an embodiment of the present invention FIG. 3 A diagram for explaining a fluctuation in steering angle of the vehicle FIG. 4 A diagram exemplifying a degree of shaking of steering expressed in frequency FIG. 5 A flowchart illustrating an example of a process executed by an arithmetic unit in FIG. 2.

Hereinafter, an embodiment of the present invention will be described with reference to FIGS. 1 to 5. A driving ability determination system according to the embodiment of the present invention determines a driving ability of a driver of a vehicle. Generally, a driving behavior of the driver includes three elements of cognition, judgment, and operation. It is known that an ability related to a "cognitive function", which is an intelligent function of a person related to the cognition and the judgment among the three elements, gradually decreases as the person gets older. The decrease in cognitive function makes it difficult to safely drive the vehicle. By determining a driving ability related to a cognitive function based on travel data obtained when a driver drives a vehicle, so that the driver himself/herself or his/her family grasps that the cognitive function of the driver tends to decrease, safe driving can be supported.

FIG. 1 is a diagram for explaining a travel section and a driving load. As illustrated in FIG. 1, a driving load applied to a driver according to a driving behavior varies depending on a different travel section such as a road shape. For example, the driving load increases during traveling on an S-shaped curve or a crank path, during parking in a parking space, or the like. That is, in a travel section in which the driver is required to perform many steering operations per vehicle movement amount and the travel locus of the vehicle has a complicated shape, the operation load applied due to the driving operation becomes large. In such a case, a high driving skill is required because steering is required very frequently, it is necessary to operate the steering in conjunction with an operation of an accelerator or a brake, and a sense of vehicle is also required. In such a travel section (high-load section), a driver's driving skill greatly affects driving stability.

On the other hand, an operation load is hardly applied during traveling on a straight track or the like. That is, in a travel section in which the driver is required to perform almost no steering operation per vehicle movement amount, and the travel locus of the vehicle has an extremely simple shape, there is almost no operation load applied due to the driving operation. In such a travel section (no-load section), a driver's driving skill hardly affects driving stability.

During traveling on a curved road, during a lane change on a road with a plurality of lanes, during right/left turning at an intersection, or the like, a middle driving load is applied. Even in such a travel section (low-load section), a driver's driving skill does not greatly affect driving stability.

However, even in the low-load section, during a turning operation by which a traveling direction of the vehicle is changed by crossing an opposite lane at the intersection (right turning in a country or a region where left-hand traffic of the vehicle is adopted, and left turning in a country or a region where right-hand traffic is adopted, which will hereinafter be simply referred to as "right turning"), when the driver recognizes a target track of the vehicle, the driver needs to grasp a situation of a travel lane immediately after turning right while grasping a situation of an opposite lane ahead, and a driver's line-of-sight moves between the opposite lane ahead and the travel lane immediately after turning right. In such a right-turning section, the driver's mental activity increases, and the driving load, particularly the cognitive load related to cognition, increases, so a driver's cognitive function state affects driving stability.

By acquiring travel data in such a right-turning section in such a manner as to be distinguishable from those in the other sections and evaluating driving stability based on the acquired travel data, a driving ability related to a cognitive function of the driver can be determined. The travel data in the right-turning section can be distinguished from the other travel data based on information on the steering angle of the steering wheel.

Meanwhile, even in the low-load section or the no-load section other than the right-turning section, the cognitive load may increase in a case where a predetermined event that gives a psychological load to the driver occurs. For example, in a case where some information is notified in the vehicle during driving, when a situation in which a safety device of the vehicle operates or a situation in which sudden braking or horn is required occurs, the cognitive load increases. Therefore, in the present embodiment, the driving ability determination system is configured as follows so that a driving ability related to a cognitive function can be appropriately determined by handling the travel data acquired when the predetermined event occurs separately from other travel data.

FIG. 2 is a block diagram illustrating an example of a main configuration of a driving ability determination system (hereinafter, a system) 10. As illustrated in FIG. 2, the system 10 includes a computer including an arithmetic unit 11 such as a CPU, a storage unit 12 such as a ROM or a RAM, and peripheral circuits thereof. The arithmetic unit 11 includes, as functional components, an information acquisition unit 13, a travel data extraction unit 14, an event occurrence determination unit 15, an evaluation value calculation unit 16, a cognitive function evaluation unit 17, and an information output unit 18. The storage unit 12 stores programs to be executed by the arithmetic unit 11 and information such as setting values. The system 10 may be configured as an in-vehicle device mounted on a vehicle, or may be configured as a server device or the like provided outside the vehicle.

The information acquisition unit 13 acquires time-series travel data of a vehicle for each pre-registered driver. For example, the information acquisition unit 13 acquires travel data measured in a pre-registered vehicle that is routinely driven by each driver. The travel data includes not only time-series information on the steering angle of the steering wheel, but also information on the turning-on of the warning light or the indicator light, information on the operation of the safety device such as the anti-skid device or the anti-lock brake system, information on the operation of the horn, information on the deceleration of the vehicle, etc. The travel data may include information regarding the activation of warnings and functions provided by the advanced driver assistance system, such as lane departure warnings. In addition, the travel data may also include information on whether or not a notification is output via the in-vehicle speaker or display, and whether or not there is an audio input of a predetermined volume or more from a horn of a surrounding vehicle, an emergency vehicle, a street promotion vehicle, or the like via the in-vehicle microphone. Furthermore, the travel data may also include an image of a driver's face taken by the in-vehicle camera and a result of processing the image, and an image of the outside world taken by the out-vehicle camera and a result of processing the image.

The travel data is transmitted to the system 10, for example, at a predetermined cycle via a telematics control unit (TCU) mounted on the vehicle. The information acquisition unit 13 acquires travel data transmitted from a pre-registered vehicle as time-series travel data for each pre-registered driver. The time-series travel data for each driver acquired by the information acquisition unit 13 is stored in the storage unit 12.

Based on the time-series travel data acquired by the information acquisition unit 13, the travel data extraction unit 14 extracts first travel data acquired when the vehicle travels in the no-load section or the low-load section (no-load/low-load section), and extracts second travel data acquired when the vehicle travels in the right-turning section. More specifically, the travel data extraction unit 14 determines a travel section for each unit time based on a time-dependent change in steering angle, and extracts travel data acquired in a period in which it is determined that the vehicle is traveling in the no-load/low-load section as the first travel data. In addition, the travel data extraction unit 14 extracts travel data acquired in a period in which it is determined that the vehicle is traveling in the right-turning section as the second travel data.

Based on the travel data acquired by the information acquisition unit 13, more specifically, the first travel data and the second travel data extracted by the travel data extraction unit 14, the event occurrence determination unit 15 determines whether or not a predetermined event that increases the cognitive load has occurred for each unit time. Here, the predetermined event may be a sudden event that occurs while the vehicle is traveling and that is relatively difficult for the driver to predict.

The event occurrence determination unit 15 determines whether or not the warning light or the indicator light has been turned on, for example, based on the information on the turning-on of the warning light or the indicator light. In addition, the event occurrence determination unit 15 determines whether or not the safety device has been operated based on the information on the operation of the safety device, and determines whether or not the horn has been operated based on the information on the operation of the horn. In addition, the event occurrence determination unit 15 determines whether or not the deceleration of the vehicle has increased to a predetermined value or more, that is, whether or not the vehicle has been suddenly braked, based on the information on the deceleration. In addition, the event occurrence determination unit 15 determines whether or not a warning or a function provided by the advanced driving assistance system has been activated, whether or not a notification has been output in the vehicle, or whether or not an audio input of a predetermined volume or more (e.g., a horn sound from a surrounding vehicle) has occurred.

In addition to or instead of them, the event occurrence determination unit 15 may determine whether or not there is a traffic participant within a predetermined distance from the vehicle and the direction of the diver's line of sight is directed to the traffic participant based on the image from the in-vehicle camera or the out-vehicle camera and the result of processing the image. Furthermore, the event occurrence determination unit 15 may estimate an emotion of the driver by applying a driver's facial expression to one of the human emotion patterns based on the image from the in-vehicle camera and the result of processing the image, and determined whether or not the estimated emotion is surprise.

The evaluation value calculation unit 16 calculates an α value (first evaluation value) indicating the steering characteristic of the driver based on the first travel data extracted by the travel data extraction unit 14, and calculates an Hp value (second evaluation value) indicating the steering characteristic of the driver when the cognitive load increases based on the second travel data. At this time, the α value or the Hp value is calculated after excluding travel data acquired from a time point at which it is determined by the event occurrence determination unit 15 that a predetermined event has occurred to a time point at which a predetermined time has elapsed from the travel data, or correcting the travel data as will be described below. That is, in a special situation in which the cognitive load is abnormally increased after the occurrence of the predetermined event, the travel data during that time may be excluded or corrected. The predetermined time may be a constant time (e.g., about 30 seconds), or may be changed according to the content of the event that has occurred.

Figure 3:
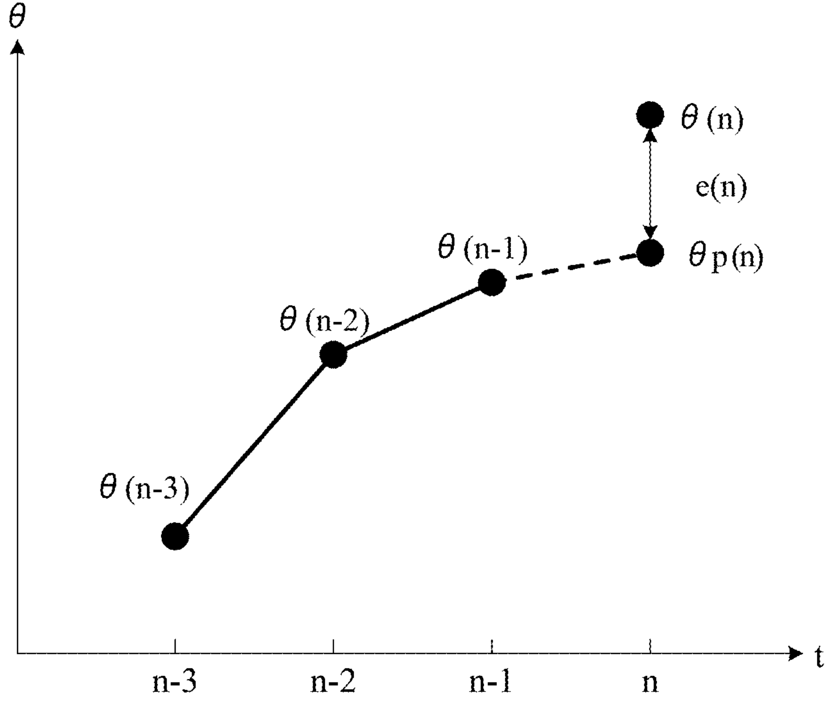

FIG. 3 is a diagram for explaining a fluctuation in steering angle θ of the vehicle. In a state where the driving of the vehicle is stable, the steering is smoothly performed without shaking, and the fluctuation in steering angle θ is small. On the other hand, in a state where the driving of the vehicle is unstable, the steering is shaking, and the fluctuation in steering angle θ is large.

More specifically, as illustrated in FIG. 3, based on actual steering angles θ(n−3), θ(n−2), and θ(n−1) at time points n−3, n−2, and n−1 immediately before a specific time point n, a predicted steering angle θp(n) at the time point n is calculated by second-order Taylor expansion centered on the time point (n−1). Since the predicted steering angle θp(n) is a value estimated on the assumption that steering is performed smoothly, the predicted steering angle θp(n) matches an actual steering angle θ(n) when actual steering is performed smoothly, and deviates from the actual steering angle θ(n) according to a degree of shaking when the actual steering is shaking. Such a degree of shaking can be expressed as a predicted error e(n) calculated by the following equation (i).

$$e(n) = \theta(n) - \theta p(n) \tag{i}$$

When the travel data is corrected and the corrected travel data is used, the evaluation value calculation unit 16 corrects travel data acquired from the time point at which it is determined that the predetermined event has occurred to the time point at which the predetermined time has elapsed so that the predicted error e(n), which is a degree of shaking, becomes small. In a case where a notification accompanied by the vibration of the steering wheel is performed, travel data acquired during the notification is excluded, and travel data acquired for a predetermined time after the notification accompanied by the vibration is terminated is corrected.

Figure 4:
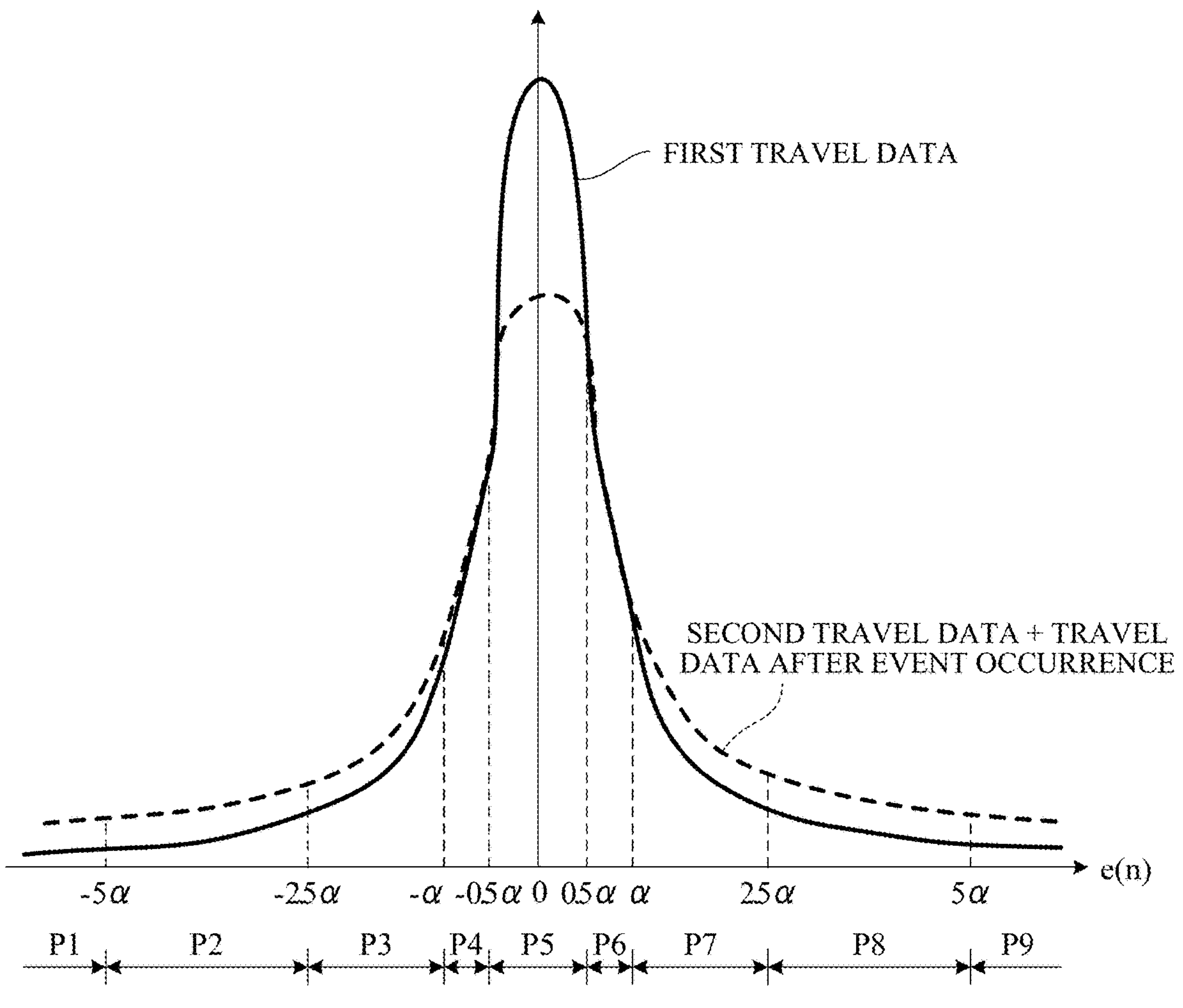

FIG. 4 is a diagram exemplifying a degree of shaking of steering expressed in frequency, and illustrates an example of a predicted error e(n) expressed in frequency. The evaluation value calculation unit 16 calculates a predicted steering angle θp(n) and a predicted error e(n) at each time point n based on first travel data obtained by excluding travel data acquired after the occurrence of the predetermined event or based on corrected first travel data, and calculates a 90th percentile value (α value) in a frequency distribution of the predicted error e(n) as indicated by the solid line. As steering is smoother and shaking of steering is smaller, the frequency distribution of the predicted error e(n) has a sharper shape centered on "0°" with no shaking of steering, and the α value is smaller. On the other hand, as shaking of steering is larger, the frequency distribution of the predicted error e(n) has a broader shape and the α value is larger.

By using the first travel data in the no-load/low-load section, excluding the high-load section in which many steering operations are required, and a driving skill greatly affects shaking of steering, an α value indicating a degree of shaking of steering of the driver in a normal state can be appropriately calculated. In addition, the α value can be calculated more appropriately by excluding travel data acquired after the occurrence of the predetermined event of the travel data for the first section or by correcting the travel data for the first section.

Furthermore, the evaluation value calculation unit 16 calculates an Hp value indicating the steering characteristic of the driver when the cognitive load increases, based on the calculated α value and the second travel data.

More specifically, the evaluation value calculation unit 16 calculates a predicted steering angle θp(n) and a predicted error e(n) at each time point n based on second travel data obtained by excluding travel data acquired after the occurrence of the predetermined event or based on corrected second travel data, and divides the frequency distribution of the predicted error e(n) as indicated by the broken line into nine ranges P1 to P9 based on α values. That is, based on eight reference values −5α, −2.5α, −α, −0.5α, 0.5α, α, 2.5α, and 5α, the frequency distribution of the predicted error e(n)

is divided into nine ranges P1 (−5α or less), P2 (−5α to −2.5α), P3 (−2.5α to −α), P4 (−α to −0.5α), P5 (−0.5α to 0.5α), P6 (0.5α to α), P7 (α to 2.5α), P8 (2.5α to 5α), and P9 (5α or more). Then, the evaluation value calculation unit 16 calculates a steering entropy value (Hp value) by the following equation (ii) based on ratios p1 to p9 of the ranges P1 to P9.

$$H_p = -\sum pi \log_9 pi \tag{ii}$$

The Hp value, which indicates smoothness of steering, becomes a smaller value as the frequency distribution of the predicted error e(n) becomes sharper with less shaking of steering, and becomes a larger value as the frequency distribution of the predicted error e(n) becomes broader with more shaking of steering. By using the second travel data acquired in the right-turning section where the line of sight shifts a large number of times and the cognitive function greatly affects shaking of steering, it is possible to appropriately calculate an Hp value indicating shaking of steering of the driver when the cognitive load becomes higher as compared with that in the normal state. In addition, the Hp value can be calculated more appropriately by excluding travel data acquired after the occurrence of the predetermined event of the travel data for the second section or by correcting the travel data for the second section.

The cognitive function evaluation unit 17 evaluates a cognitive function of the driver based on the Hp value calculated by the evaluation value calculation unit 16. That is, by continuously monitoring the Hp value indicating shaking of steering when the cognitive load increases, it is possible to evaluate that the cognitive function of the driver tends to decrease. For example, when the Hp value calculated periodically (e.g., monthly) based on the travel data on routine driving tends to increase, it is evaluated that the cognitive function tends to decrease.

The information output unit 18 transmits a result of the evaluation performed by the cognitive function evaluation unit 17 to a user terminal of the driver himself/herself, his/her family, or the like. For example, a notification can be transmitted to an e-mail address registered in advance. In this case, with the notification as a trigger, the driver himself/herself, his/her family, or the like can consider return of the driver's license, replacement with a vehicle having enhanced driving support functions, or the like. Since objective information is provided based on the travel data, it is easy for the driver to accept a current state of his/her cognitive function, and the driver can consider an appropriate measure at an early stage.

Figure 5:
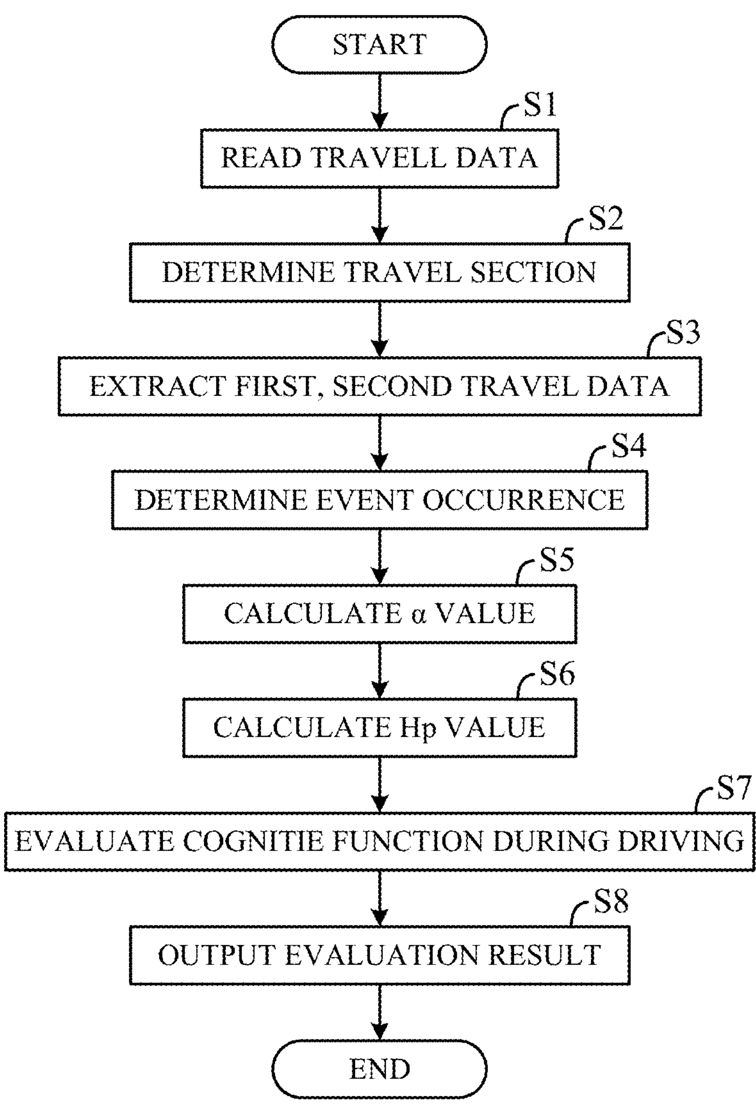

FIG. 5 is a flowchart illustrating an example of a process executed by the arithmetic unit 11 of the system 10. The process illustrated in this flowchart is executed, for example, periodically. First, in step S1, all time-series travel data stored in the storage unit 12 is read. Next, in step S2, a travel section for each unit time is determined. Next, in step S3, first travel data acquired in a period determined as a no-load/low-load section and second travel data acquired in a period determined as a right-turning section in step S2 are extracted from the entire travel data read in step S1. Next, in step S4, it is determined whether or not a predetermined event has occurred for each unit time based on the first travel data and the second travel data extracted in step S3.

Next, in step S5, an α value is calculated based on the first travel data extracted in step S3, after excluding travel data acquired from a time point at which it is determined in step S4 that a predetermined event has occurred to a time point at which a predetermined time has elapsed from the first travel data, or after correcting the first travel data. Next, in step S6, an Hp value is calculated based on the second travel data extracted in step S3 and the α value calculated in step S5, after excluding travel data acquired from the time point at which it is determined in step S4 that the predetermined event has occurred to the time point at which the predetermined time has elapsed from the second travel data, or after correcting the second travel data. The latest Hp value calculated in step S6 is stored and accumulated in the storage unit 12. Next, in step S7, the latest Hp value stored in the storage unit 12 is compared with the past Hp values to determine a driving ability related to the cognitive function of the driver. Next, in step S8, a result of the evaluation of step S7 is transmitted to a mail address registered in advance, and the process ends.

As described above, since the α value and the Hp value, which are indices for determining a driving ability of the driver, can be calculated only based on the routine travel data, the driving ability can be determined without hindering the driving (steps S1 to S6). In addition, the α value and the Hp value can be appropriately calculated by excluding travel data acquired after the occurrence of the predetermined event, which is a special situation in which the cognitive load is abnormally increased, or by correcting the travel data (steps S2 to S6). In addition, since the cognitive function of the driver is automatically evaluated only based on the route travel data, and the evaluation result is notified to the driver himself/herself or his/her family, it is possible to reduce the watching burden on the family living apart from the elderly person who drives the vehicle (S1 to S8).

According to the present embodiment, the following operations and effects can be achieved.

(1) A system 10 includes an information acquisition unit 13 that acquires time-series travel data of a vehicle, an evaluation value calculation unit 16 that calculates an evaluation value of a driving ability indicating a steering characteristic of a driver based on the travel data, and an event occurrence determination unit 15 that determines whether or not a predetermined event that increases a cognitive load has occurred based on the travel data (FIG. 2).

The evaluation value calculation unit 16 specifies, as specific travel data, travel data acquired after a time point at which it is determined that the predetermined event has occurred of the travel data, and calculates the evaluation value of the driving ability based on travel data obtained by excluding the specific travel data from the travel data or based on travel data corrected so that a weight for an evaluation value of a driving ability of the specific travel data is lower than a weight for an evaluation value of a driving ability of the other travel data. As a result, since an α value and an Hp value, which are indices for determining a driving ability of a driver, can be calculated based on the routine travel data, the driving ability can be determined without hindering the driving.

In addition, by handling the travel data acquired after the occurrence of the predetermined event separately from the other travel data, the driving ability related to the cognitive function can be appropriately determined. For example, the α value and the Hp value can be appropriately calculated by excluding travel data acquired during a special situation in which the cognitive load is abnormally increased.

(2) The evaluation value calculation unit 16 specifies, as specific travel data, travel data acquired from the time point at which it is determined that the predetermined event has occurred to a time point at which a predetermined time has elapsed of the travel data. That is, when a predetermined event that gives a psychological load to the driver occurs, since the cognitive load increases for a certain period thereafter, the driving ability related to the cognitive function can be appropriately determined by handling travel data during that period separately from the other travel data.

(3) The evaluation value calculation unit 16 calculates an α value indicating the steering characteristic of the driver based on travel data obtained by excluding the specific travel data from the first travel data or based on travel data corrected so that a weight for an evaluation value of a driving ability of the specific travel data included in the first travel data is lower than a weight for an evaluation value of a driving ability of the other first travel data, and calculates an Hp value indicating the steering characteristic of the driver when a predetermined load acts on the driver based on the calculated α value and the second travel data. That is, after the occurrence of the predetermined event, which is a special situation in which the cognitive load is abnormally increased, the travel data during that time is corrected so that the predicted error e(n), which is a degree of shaking, becomes small for use in calculating an α value and an Hp value. As a result, the α value and Hp value can be appropriately calculated.

(4) The evaluation value calculation unit 16 calculates an Hp value based on the α value and travel data obtained by excluding the specific travel data from the second travel data or based on the α value and travel data corrected so that a weight for an evaluation value of a driving ability of the specific travel data included in the second travel data is lower than a weight for an evaluation value of a driving ability of the other second travel data.

(5) The predetermined event is any of an operation of a notification device that notifies the driver of information, an operation of a safety device provided in the vehicle, an increase in deceleration of the vehicle to a predetermined value or more, and an occurrence of a horn around the vehicle. That is, when some information is notified in the vehicle during driving, in a situation in which a safety device of the vehicle operates or in a situation in which sudden braking or horn occurs, a psychological load is applied to the driver, and the cognitive load increases. By handling such travel data acquired when the predetermined event occurs separately from the other travel data, the driving ability related to the cognitive function can be appropriately determined.

In the above-described embodiment, it has been described as an example that the travel data extraction unit 14 extracts first travel data and second travel data by determining a travel section for each unit time based on a temporal change in steering angle, but the travel data extraction unit is not limited thereto. For example, the travel section for each unit time may be determined based on a temporal change in position information of the vehicle, or the travel section may be specified based on position information and map information.

In the above-described embodiment, it has been described as an example, with reference to FIG. 1, etc. that an α value is calculated based on first travel data acquired when the vehicle travels in a no-load/low-load section and an Hp value is calculated based on second travel data acquired when the vehicle travels in a right-turning section, but the first section and the second section are not limited thereto. The first section and the second section only need to have a relationship in which the cognitive load is higher in the second section than the first section, and for example, a section excluding the second section of the no-load/low-load section may be set as the first section.

Although the present invention has been described above as a driving ability determination system, the present invention can also be used as a driving ability determination method. That is, the driving ability determination method includes: an information acquisition step S1 for acquiring time-series travel data of a vehicle; evaluation value calculation steps S5 and S6 for calculating evaluation value of the driving ability indicating characteristics of steering by a driver based on the travel data; and an event occurrence determination step S4 for determining whether a predetermined event that increases a cognitive load has occurred based on travel data (FIG. 5). The evaluation value calculation steps S5 and S6 includes specifying, as specific travel data, travel data acquired after a time point at which it is determined that the predetermined event has occurred of the travel data, and calculating the evaluation value of the driving ability based on travel data obtained by excluding the specific travel data from the travel data or based on travel data corrected so that a weight for the evaluation value of the driving ability of the specific travel data is lower than a weight for the evaluation value of the driving ability of rest of the travel data.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST

10 driving ability determination system (system), 11 arithmetic unit, 12 storage unit, 13 information acquisition unit, 14 travel data extraction unit, 15 event occurrence determination unit, 16 evaluation value calculation unit, 17 cognitive function evaluation unit, 18 information output unit

The invention claimed is:

1. A driving ability determination system, comprising:

a processor and a memory coupled to the processor, wherein the processor is configured to perform:

acquiring time-series travel data of a vehicle;

calculating an evaluation value indicating a steering characteristic of a driver of the vehicle based on the travel data; and determining whether a predetermined event in which a predetermined load acts on the driver has occurred based on the travel data, wherein the calculating includes specifying, as specific travel data, the travel data acquired after a time point at which it is determined that the predetermined event has occurred from among the travel data, calculating a first evaluation value indicating the steering characteristic of the driver based on the travel data obtained by excluding the specific travel data from first travel data acquired or based on the travel data corrected so that a weight for the evaluation value of the specific travel data included in the first travel data is lower than a weight for the evaluation value of a rest of the first travel data, and calculating a second evaluation value indicating the steering characteristic of the driver when the predetermined load acts on the driver based on the first evaluation value and second travel data, wherein the processor is further configured to perform:

evaluating a cognitive function of the driver based on the first evaluation value and the second evaluation value; and outputting an evaluation result of the cognitive function to a user terminal.

2. The driving ability determination system according to claim 1, wherein the calculating includes specifying, as the specific travel data, the travel data from the time point at which it is determined that the predetermined event has occurred to a time point at which a predetermined time has elapsed from among the travel data.

3. The driving ability determination system according to claim 1, wherein the calculating includes calculating the second evaluation value based on the first evaluation value and the travel data obtained by excluding the specific travel data from the second travel data or based on the first evaluation value and the travel data corrected so that a weight for the evaluation value of the specific travel data included in the second travel data is lower than a weight for the evaluation value of a rest of the second travel data.

4. The driving ability determination system according to claim 1, wherein the predetermined event is any of an operation of a notification device that notifies the driver of information, an operation of a safety device provided in the vehicle, an increase in deceleration of the vehicle to a predetermined value or more, and an occurrence of a horn around the vehicle.

5. A driving ability determination method, comprising the steps of:

acquiring time-series travel data of a vehicle;

calculating an evaluation value indicating a steering characteristic of a driver of the vehicle based on the travel data; and determining whether a predetermined event in which a predetermined load acts on the driver has occurred based on the travel data, wherein the calculating includes specifying, as specific travel data, the travel data acquired after a time point at which it is determined that the predetermined event has occurred from among the travel data, calculating a first evaluation value indicating the steering characteristic of the driver based on the travel data obtained by excluding the specific travel data from first travel data acquired or based on the travel data corrected so that a weight for the evaluation value of the specific travel data included in the first travel data is lower than a weight for the evaluation value of a rest of the first travel data, and calculating a second evaluation value indicating the steering characteristic of the driver when the predetermined load acts on the driver based on the first evaluation value and second travel data acquired, wherein the driving ability determination method further comprises:

evaluating a cognitive function of the driver based on the first evaluation value and the second evaluation value; and outputting an evaluation result of the cognitive function to a user terminal.

* * * * *